(12) United States Patent
Leiter et al.

(10) Patent No.: US 9,060,412 B2
(45) Date of Patent: Jun. 16, 2015

(54) ION DRIVE FOR A SPACECRAFT

(75) Inventors: Hans Leiter, Oedheim (DE); Johann Mueller, Munich (DE); Horst Neumann, Delitzsch (DE); Frank Scholze, Brandis (DE)

(73) Assignee: Astrium GmbH, Taufkirchen (DE)

( * ) Notice: Subject to any disclaimer, the term of this patent is extended or adjusted under 35 U.S.C. 154(b) by 1063 days.

(21) Appl. No.: 13/129,943

(22) PCT Filed: Nov. 11, 2009

(86) PCT No.: PCT/DE2009/001600
§ 371 (c)(1),
(2), (4) Date: Aug. 5, 2011

(87) PCT Pub. No.: WO2010/057463
PCT Pub. Date: May 27, 2010

(65) Prior Publication Data
US 2011/0277444 A1 Nov. 17, 2011

(30) Foreign Application Priority Data
Nov. 19, 2008 (DE) .......................... 10 2008 058 212

(51) Int. Cl.
*F03H 1/00* (2006.01)
*B64G 1/42* (2006.01)
(Continued)

(52) U.S. Cl.
CPC .. *H05H 1/54* (2013.01); *B64G 1/42* (2013.01); *B64G 1/428* (2013.01); *B64G 1/405* (2013.01); *F03H 1/0018* (2013.01); *F03H 1/0037* (2013.01); *H01J 27/16* (2013.01)

(58) Field of Classification Search
CPC .......... B64G 1/405; B64G 1/428; B64G 1/42; F03H 1/0037; F03H 1/0043; F03H 1/00; F03H 1/005; F03H 1/0018; F03H 1/0056; F03H 1/0062; F03H 1/0068; F03H 1/0075; F03H 1/0081; F03H 1/0087; F03H 1/0093
USPC ............ 60/202, 204, 203, 203.1; 315/111.81, 315/111.41, 111.71, 111.21, 111.91; 118/723 R, 723 I
See application file for complete search history.

(56) References Cited

U.S. PATENT DOCUMENTS 3,223,038 A * 12/1965 Bahnson ......................... 60/202
5,924,277 A 7/1999 Beattie et al.
(Continued)

FOREIGN PATENT DOCUMENTS

DE 198 35 512 C1 12/1999
DE 199 27 063 B4 1/2001
(Continued)

OTHER PUBLICATIONS

Japanes Office Action with English translation dated Jul. 23, 2013 (six (6) pages).
(Continued)

*Primary Examiner* — William H Rodriguez
*Assistant Examiner* — William Breazeal
(74) *Attorney, Agent, or Firm* — Crowell & Moring LLP

(57) ABSTRACT

An ion drive for a spacecraft, including a high-frequency generator for generating an alternating electromagnetic field for the ionization of a propellant and an acceleration system for the charge carriers, is provided. The ion drive includes a voltage source with which the high voltages that are necessary for the acceleration system can be derived from the currents and/or voltages generated by the high-frequency generator for generating the alternating electromagnetic field.

20 Claims, 1 Drawing Sheet

(51) Int. Cl.
   *H01J 27/16* (2006.01)
   *B64G 1/40* (2006.01)
   *H05H 1/54* (2006.01)

(56) References Cited

U.S. PATENT DOCUMENTS

| | | |
|---|---|---|
| 5,947,421 A | 9/1999 | Beattie et al. |
| 6,195,980 B1 | 3/2001 | Walther |
| 6,293,090 B1 | 9/2001 | Olson |
| 6,378,290 B1 | 4/2002 | Killinger et al. |
| 6,724,160 B2 | 4/2004 | Kaufman et al. |
| 2006/0290287 A1 | 12/2006 | Kuninaka |
| 2008/0151584 A1* | 6/2008 | Wiseman ............ 363/61 |
| 2009/0308049 A1 | 12/2009 | Wallace |
| 2012/0019143 A1 | 1/2012 | Kadrnoschka et al. |

FOREIGN PATENT DOCUMENTS

| | | |
|---|---|---|
| DE | 199 48 229 C1 | 5/2001 |
| EP | 0 639 939 B1 | 2/1995 |
| EP | 1 739 716 A1 | 1/2007 |
| JP | 10-259782 A | 9/1998 |
| JP | 11-82286 A | 3/1999 |
| JP | 2000-54951 A | 2/2000 |
| JP | 2001-159387 A | 6/2001 |
| JP | 2006-147449 A | 6/2006 |
| JP | 2009-85206 A | 4/2009 |
| JP | 2009-543980 A | 12/2009 |
| JP | 2011-522357 A | 7/2011 |

OTHER PUBLICATIONS

Japanese Office Action with English translation dated Dec. 18, 2012 (four (4) pages).

International Search Report including partial English language translation dated Apr. 15, 2010 (Seven (7) pages).

PCT/ISA/237 Form (Six (6) pages), Jul. 2009.

* cited by examiner

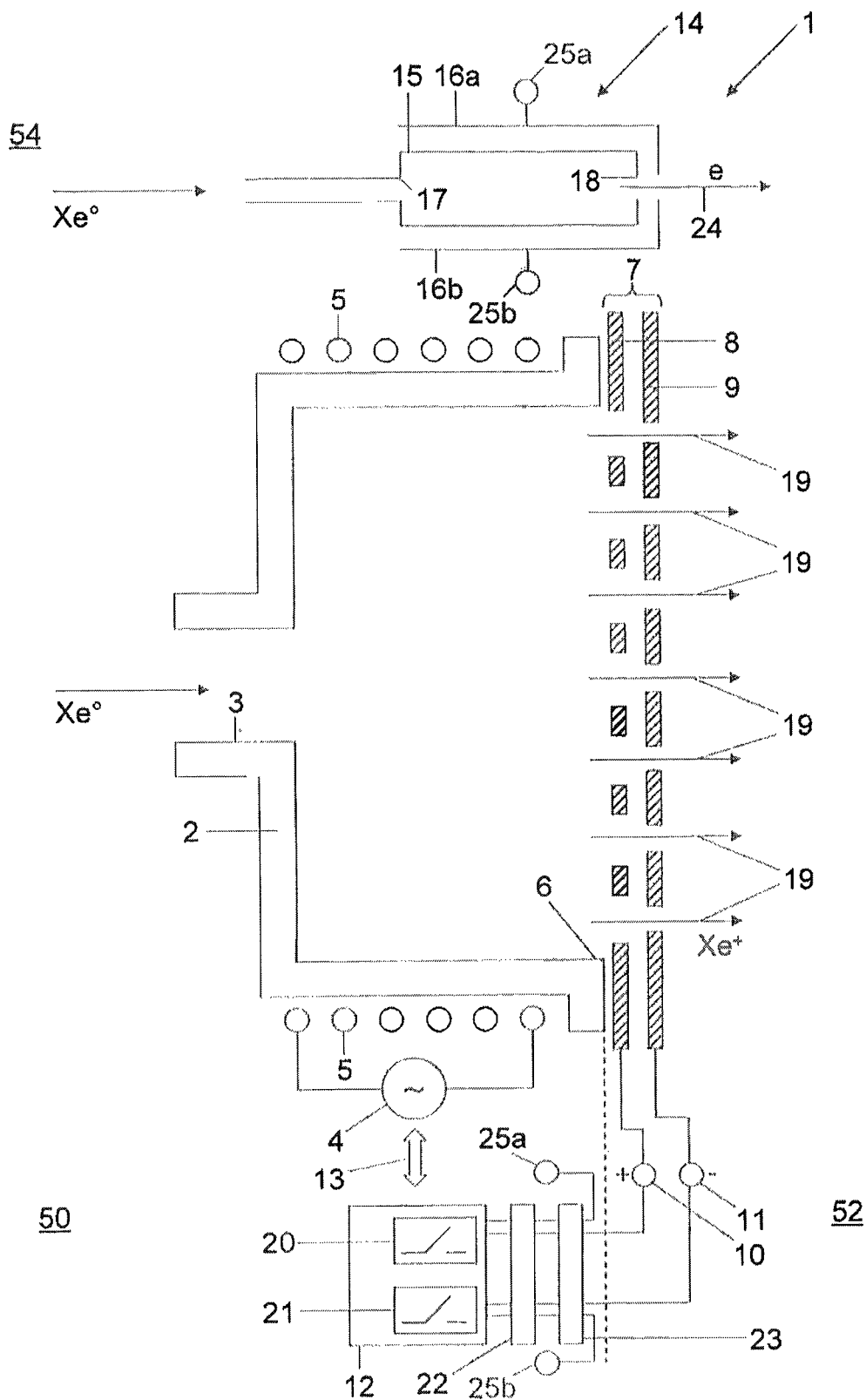

ION DRIVE FOR A SPACECRAFT

CROSS-REFERENCE TO RELATED APPLICATIONS

The present application is a national stage of PCT International Application No. PCT/DE2009/001600, filed Nov. 11, 2009, and claims priority under 35 U.S.C. §119 to German Patent Application No. 10 2008 058 212.3, filed Nov. 19, 2008, the entire disclosures of which afore-mentioned documents are herein expressly incorporated by reference.

BACKGROUND AND SUMMARY OF THE INVENTION

The present invention relates to an ion drive for a spacecraft, comprising a high-frequency generator for generating an alternating electromagnetic field for the ionization of a propellant and a suitable system for ion acceleration.

In space flight, electrical engines are being used to an increasing extent to propel satellites or space probes after their separation from a boost vehicle. Electrical engines are used especially for a trajectory correction of geostationary communication satellites (so-called station-keeping). Above all, ion engines and SPT plasma engines are used for this purpose. Both of these types of engines generate their thrust by emitting accelerated ions. In order to avoid a charging of the satellite, the emitted ion beam is neutralized. The electrons usually required for this are provided from a separate electron source and introduced into the ion beam by means of plasma coupling.

In high-frequency ion engines (Radio Frequency Ion Thruster, RIT), the propellant is ionized with the aid of an alternating electromagnetic field and then accelerated in an electrostatic field to generate thrust. After the passage of a neutralizer, which feeds electrons to the ion beam again and balances the generated positive space charge, the particles are emitted in the form of a beam. To operate this ion drive, a gas supply, an HF generator for generating the alternating electromagnetic field and high-voltage sources for generating a field accelerating the charge carrier are necessary. With conventional grid systems for generating the electrostatic field for ion acceleration, the voltages of the high-voltage generator and of the grid system must be coordinated to generate thrust. Likewise, at least one voltage source is required for the neutralizer for neutralizing the positive ion beam by electrons from an electron source.

The ion drive is characterized by a simple structure and high reliability. However, a high degree of complexity results due to the electronic assemblies required for the voltage supply of the components described.

It is therefore an object of the present invention to provide an ion drive for a spacecraft, in particular an RIT engine, which is structurally simpler in design and can be produced more cost-effectively. Another object of the present invention is to provide a method for operating an ion drive, in particular an RIT engine, in which the operational reliability can be increased and the control effort can be minimized.

These and other objects are attained by an ion drive with the features of claim 1 and by a method with the features of claim 15. Advantageous embodiments are shown by the dependent claims.

The present invention creates an ion drive for a spacecraft, comprising a high-frequency generator for generating an alternating electromagnetic field for the ionization of a propellant, in particular a gas, and a system for accelerating the generated charge carriers. The invention is characterized in that the ion drive comprises a first means with which the high voltages that are necessary for the system to accelerate the generated charge carriers from the currents and/or voltages generated by the high-frequency generator to generate the alternating electromagnetic field can be derived.

The ion drive according to the invention is a high-frequency ion drive, in particular a radio-frequency ion thruster (RIT). A gas, such as xenon, can be used as a propellant. The ion drive according to the invention has the advantage that the mass of the ion drive can be reduced compared to conventional ion drives due to the simplification of the voltage supply system. At the same time, operational reliability can be increased and control effort can be minimized.

In one embodiment, the first means is embodied to draw at least the high voltage(s) necessary for ion acceleration from the currents and/or voltages generated by the high-frequency generator for generating the alternating electromagnetic field. With a conventional two grid acceleration system, the first grid is a screen grid and the second grid is an acceleration grid. If the grid system comprises more than these two grids, the high voltages required for the further grids are also derived by the first means from the currents and/or voltages generated by the high-frequency generator.

In a first embodiment, the first means has at least one capacitor coupled to the high-frequency generator for coupling out a part of the power generated by the high-frequency generator.

In an alternative embodiment, the first means for coupling out a part of the power generated by the high-frequency generator comprises at least one coupling coil coupled to the high-frequency generator, at the coil terminals of which coupling coil the voltages necessary for the grid system are provided. In particular, the at least one coupling coil is embodied in the form of a secondary winding of a transformer, which is coupled to a coil of the high-frequency generator as primary winding of the transformer. The high-voltage transformer, which can be integrated into the high-frequency system, provides at the output thereof the voltages for the acceleration system. It can furthermore be provided that the at least one coupling coil has respectively one or more taps, wherein it is or they are galvanically separated from a coil of the high-frequency generator.

Optionally, a second means can be provided for rectifying the voltages derived from the high-frequency generator for the grid system. In particular, a rectification of the voltages for the acceleration system of the ion drive, the ion sources, the neutralizers or the electron sources is provided.

Furthermore, it can be expedient to provide a third means for smoothing the rectified voltages for the acceleration system. The smoothing can be formed by a network of coils (L) and/or capacitors (C) and/or impedances (R). In particular, an LC, an L, a C or an RLC network can be provided for smoothing. The network of coils and/or capacitors and/or impedances is furthermore used to optimize the phase position at the acceleration system. For a radio frequency ion thruster, phase position and voltages on the acceleration system may be adjusted such that the average ion beam corresponds to an average electron beam. As explained above, the latter can also be provided by a separate neutralizer.

For proper operation of the ion drive, the respective components must be operated with a corresponding voltage. The establishment of the voltage ratio between respective voltages of the grid system and the voltages of the high-frequency generator is carried out according to one embodiment by a high-voltage cascade, comprising a number of capacitors and diodes, and/or by the winding ratio of the coil of the high-frequency generator to the coupling coil or coils. Due to a high-voltage cascade, the voltage provided by the high-frequency generator can be increased. A cascading connection of this type is also known under the term charge pump.

According to a further advantageous embodiment, at least one controllable switch is provided between the high-frequency generator and the acceleration system for the time control of the charge-carrier current. The at least one controllable switch can be embodied as a mechanical or electronic switch. In particular, semiconductor switches can be provided.

In a further embodiment, a fourth means for reversing the polarity of the voltages at the grid system is provided for the extraction and acceleration of ions and electrons. In this embodiment, the rectification arranged downstream of the first means can be omitted, since the polarity at the components of the acceleration system with respect to one another changes and alternately electrons and ions are produced. The voltages at the acceleration system may be expediently chosen such that the ion current is equivalent to the electron current. The phase position at the components of the acceleration system can be influenced by suitable RCL networks, as has been explained. A further advantage of this embodiment is that a separate neutralizer can be omitted, which results in a further simplification of the ion drive.

In an alternative embodiment, the ion drive has a neutralizer, wherein a voltage necessary for the operation thereof is derived from the currents and/or voltages generated by the high-frequency generator to generate the alternating electromagnetic field, and is provided in particular by the first means. In this embodiment, the ion drive according to the invention makes it possible to omit a separate voltage source for the operation of the neutralizer. This results in the already explained simpler structural design with reduced mass of the ion engine.

The invention also includes a method for operating an ion drive for a spacecraft, which comprises a high-frequency generator for generating an alternating electromagnetic field for the ionization of a propellant and an acceleration system for generating an electrostatic field for ion acceleration. According to the invention, the high voltages required for the acceleration system are derived from the currents and/or voltages generated by the high-frequency generator for generating the alternating electromagnetic field. The same advantages are associated with this as were explained above in connection with the ion drive according to the invention.

The invention is explained in more detail below based on an exemplary embodiment.

BRIEF DESCRIPTION OF THE DRAWING FIGURES

The sole FIGURE shows in a diagrammatic representation a cross section through an ion drive according to the invention.

DETAILED DESCRIPTION OF THE DRAWING FIGURES

The ion drive 1 has a discharge chamber 2 (ionizer). At an inlet 3 via a valve (not shown), propellant (e.g., xenon gas) can be introduced into the discharge chamber 2 for ionization. A coil 5 wound around the discharge chamber 2 is embodied with a high-frequency generator 4 for generating an alternating electromagnetic field in the interior of the discharge chamber 2 to ionize the propellant. An outlet 6 is provided at one end of the discharge chamber 2 lying opposite the inlet 3. A grid system 7 adjoins the outlet 6, which grid system as a first grid 8 has a screen grid (plasma boundary anchor) and as a second grid 9 has an acceleration grid. To operate the grid system 7, the first grid 8 needs a positive high voltage and the second grid 9 needs a negative high voltage. The positive supply voltage is provided at a potential terminal 10 for the first grid 8 and the negative high voltage is provided at a potential terminal 11 for the second grid 9.

In a known manner, the ion drive 1 in the exemplary embodiment shown has a neutralizer 14, including a chamber 15, at the inlet 17 of which a gas (e.g., xenon) is introduced into the chamber 15. The chamber 15 is surrounded by electrodes 16a, 16b, so that at an outlet 18 of the chamber 15 an electron beam 24, equivalent to the ion beam 19, can be generated to neutralize the ion beam 19. A high voltage is provided for the neutralizer at potential terminals 25a, 25b of the electrodes 16a, 16b of the neutralizer.

By changing the polarity at the grid system 7 of the ion drive 1, instead of ions, electrons can also be extracted from the discharge chamber 2 and accelerated through the grid system 7. Through a corresponding selection of the extraction times for ions and electrons and/or the level of the voltages at the potential terminals 10, 11 for the two extraction phases, an electron current equivalent to the ion current can be adjusted. In this case, the neutralizer 14 can be omitted.

The ion drive 1 thus comprises in a known manner three functional regions: a region 50 for ion generation, a region 52 for ion acceleration and an optional region 54 for the neutralization of the ion beam.

The generation of the high voltages, which are necessary for the operation of the ion drive, for the grid 7 and the optional neutralizer 14 is not carried out via its own voltage sources, but through a first means 12, with which the high voltages necessary for the grid system 7 and the optional neutralizer can be derived from the currents and/or voltages generated by the high-frequency generator 4. In the FIGURE, the conductance of the corresponding high voltages is symbolized by a coupling (Arrow 13) between the high-frequency generator 4 and the first means 12.

The conductance of the high voltages and the provision at the potential terminals 10, 11 and optionally 25a, 25b, can be carried out, for example, in that a part of the high frequency power is coupled out of the high-frequency generator 4 coupled to the coil 5 by capacitors (not shown). In this embodiment, the voltage applied to the capacitors is rectified by a second means for rectification 22 and optionally smoothed by a third means 23. If the necessary voltage at the grids 8, 9 of the grid system 7 is higher than the voltage that can be taken from the high-frequency circuit, a cascade connection, comprising capacitors and diodes can be provided in the first means 12, which increases the voltage to the necessary level. A corresponding cascade connection can likewise be provided for the electrodes 16a, 16b of the neutralizer.

Alternatively, the voltages required for the operation of the grid system 7 and of the optional neutralizer 14 can be provided by at least one coupling coil (not shown), at the coil terminals of which the voltages required for the grid system can be picked off. In a variant, for example, a high-voltage transformer can be integrated into the high frequency system so that the necessary voltages for the grid system are available at the outlet thereof. Likewise, one or more coupling coils with optionally one or more taps can be arranged directly on the discharge chamber 2 (not shown). The coupling coil or coils are embodied such that they are galvanically separated from the coil 5 for ionizing the propellant. The coupling coil or coils may be attached such that there is a good coupling between the coil 5 and the coil or coils for the grid system 7 or the optional neutralizer 14.

The means 22 and 23, described above, for rectifying and smoothing the voltages can likewise be provided in the case of the coupling coils. However, a further simplification of the drive system is possible with the out-coupling of power by coils, since the downstream rectification can likewise be omitted. In this case, the polarity of the grids 8, 9 of the grid system to one another changes, so that alternately electrons and ions are produced. The voltages at the grids 8, 9 may be selected such that the ion current is equivalent to the electron current. Where applicable, an adjustment of the phase position at the plasma boundary anchor 8 and at the acceleration grid 9 is necessary, which can be influenced by suitable RCL circuits (not shown).

The means 22 and 23 for rectifying and smoothing can generally be omitted for an ion drive which operates without a neutralizer 14. In the case of a drive of this type, electrons as well as ions are extracted from the discharge chamber 2 and accelerated by reversing the polarity of the voltages at the grids 8, 9. LC, L, C or RLC links can be used to optimize the phase position at the grids 8, 9. The phase position and voltages may be adjusted such that the average ion current corresponds to the average electron current.

Two switches 20, 21 are illustrated diagrammatically in the means 12 for providing voltage, which switches can be embodied as mechanical or electronic switches. The switches 20, 21 are used to keep the screen grid 8 and/or the acceleration grid 9 voltage-free even if propellant is ionized in the discharge chamber 2. If necessary, a single switch can be provided for all of the grids of the grid system 7.

With increasing high-frequency power, the voltages at the potential terminals 10, 11 for the grids 8, 9 also increase. This is favorable in terms of ion optics, since the plasma density increase associated with the higher high-frequency power also requires a higher extraction voltage.

The ion drive according to the invention has the advantage that the voltage supply system can be substantially simplified. This makes it possible to save in terms of mass. Further, operational reliability is increased and control effort is minimized. Additionally, a drive can be realized without a separate neutralizer. This is made possible by a means for providing voltage, with which necessary high voltages can be derived from the currents and/or voltages generated by the high-frequency generator. In particular, voltages can be provided for the grids for high-frequency ion engines, high-frequency ion sources, high-frequency neutralizers or high-frequency electron sources.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

LIST OF REFERENCE NUMBERS

1 Ion drive
2 Discharge chamber
3 Inlet
4 High-frequency generator
5 Coil of the high-frequency generator
6 Outlet
7 Grid system
8 Screen grid/plasma boundary anchor (first grid)
9 Acceleration grid (second grid)
10 Potential terminal for the first grid 8
11 Potential terminal for the second grid 9
12 Means for providing voltage
13 Coupling (diagrammatic)
14 Neutralizer
15 Chamber
16a, 16b Electrode
17 Inlet
18 Outlet
19 Ion beam
20 Switch
21 Switch
22 Means for rectifying
23 Means for smoothing
24 Electron beam
25a, 25b Potential terminal
50 Ion generation
52 Ion acceleration
54 Neutralization of the ion beam

The invention claimed is:

1. An ion drive for a spacecraft, comprising:
a generator that generates an alternating electromagnetic field for the ionization of a propellant;
a charge carrier acceleration system that generates an electrostatic field; and a voltage source, distinct from the generator, that derives voltages for operation of the charge carrier acceleration system from at least one of an alternating current and an alternating voltage generated by the generator.

2. The ion drive according to claim 1, wherein the voltage source draws the voltages for operation of the charge carrier acceleration system from the at least one of the alternating currents and the alternating voltages generated by the generator.

3. The ion drive according to claim 1, wherein the voltage source has at least one capacitor coupled to the generator for coupling out a part of the power generated by the generator.

4. The ion drive according to claim 1, wherein the voltage source includes at least one coupling coil coupled to the generator, and the voltages for operation of the charge carrier acceleration system are provided at coil terminals of the at least one coupling coil.

5. The ion drive according to claim 4, wherein the at least one coupling coil is a secondary winding of a transformer, which is coupled to a coil of the generator as a primary winding of the transformer.

6. The ion drive according to claim 4, wherein the at least one coupling coil has one or more taps that are galvanically separated from a coil of the generator.

7. The ion drive according to claim 3, wherein a voltage rectifier is provided for rectifying the voltages derived from the generator for the charge carrier acceleration system.

8. The ion drive according to claim 7, wherein a voltage smoothing device is provided for smoothing the rectified voltages for the charge carrier acceleration system.

9. The ion drive according to claim 4, wherein a voltage ratio between respective voltages of the charge carrier acceleration system and the alternating voltage generated by the generator is established by at least one of a high-voltage cascade, including a number of capacitors and diodes, and a winding ratio of a coil of the generator to the at least one coupling coil.

10. The ion drive according to claim 1, wherein at least one controllable switch is provided between the generator and the charge carrier acceleration system for separating the voltage source.

11. The ion drive according to claim 1, wherein a voltage polarity reversing unit for reversing the polarity of the voltages at the charge carrier acceleration system is provided for extraction and acceleration of ions and electrons.

12. The ion drive according to claim 1, wherein the ion drive has a separate neutralizer, and a voltage for operation of the separate neutralizer is derived from the at least one of the alternating currents and alternating voltages generated by the generator to generate the alternating electromagnetic field and is provided by the voltage source.

13. The ion drive according to claim 2, wherein the voltage source has at least one capacitor coupled to the generator for coupling out a part of the power generated by the generator.

14. The ion drive according to claim 2, wherein the voltage source includes at least one coupling coil coupled to the generator, and the voltages for operation of the charge carrier acceleration system are provided at coil terminals of the at least one coupling coil.

15. The ion drive according to claim 5, wherein the at least one coupling coil has one or more taps that are galvanically separated from the coil of the generator.

16. The ion drive according to claim 4, wherein a voltage rectifier is provided for rectifying the voltages derived from the generator for the charge carrier acceleration system.

17. The ion drive according to claim 2, wherein at least one controllable switch is provided between the generator and the charge carrier acceleration system for separating the voltage source.

18. The ion drive according to claim 2, wherein a voltage polarity reversing unit for reversing the polarity of the voltages at the charge carrier acceleration system is provided for extraction and acceleration of ions and electrons.

19. The ion drive according to claim 2, wherein the ion drive has a separate neutralizer, and a voltage for operation of the separate neutralizer is derived from the at least one of the alternating currents and the alternating voltages generated by the generator to generate the alternating electromagnetic field and is provided by the voltage source.

20. A method for operating an ion drive for a spacecraft, including the acts of:
   generating, by a generator, an alternating electromagnetic field for ionization of a propellant;
   generating, by a charge carrier acceleration system, an electrostatic field; and
   generating, by a voltage source, voltages for operation of the charge carrier acceleration system from at least one of an alternating currents and an alternating voltages generated by the generator.

* * * * *